United States Patent
Frerking et al.

(10) Patent No.: US 7,831,055 B2
(45) Date of Patent: Nov. 9, 2010

(54) PRESENCE ACTIVATED HEARING ASSISTIVE SYSTEM

(75) Inventors: Melvin Frerking, Norcross, GA (US); George Hirvela, Carrollton, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1347 days.

(21) Appl. No.: 11/099,012

(22) Filed: Apr. 5, 2005

(65) Prior Publication Data

US 2006/0188116 A1 Aug. 24, 2006

Related U.S. Application Data

(60) Provisional application No. 60/655,112, filed on Feb. 22, 2005.

(51) Int. Cl.
*H04R 25/00* (2006.01)

(52) U.S. Cl. .................... 381/312; 381/315; 379/52

(58) Field of Classification Search ............... 381/314, 381/315, 323, 455, 556.1, 558, 90; 379/52
See application file for complete search history.

(56) References Cited

U.S. PATENT DOCUMENTS

| | | | |
|---|---|---|---|
| 4,697,283 A | 9/1987 | Lafrance | |
| 5,086,464 A | 2/1992 | Groppe | |
| 5,615,229 A | 3/1997 | Sharma | |
| 5,835,610 A | 11/1998 | Ishige | |
| 5,842,115 A | 11/1998 | Dent | |
| 5,991,420 A | 11/1999 | Stern | |
| 6,078,675 A | 6/2000 | Bowen-Nielsen | |
| 6,122,500 A | 9/2000 | Dent et al. | |
| 6,505,780 B1 | 1/2003 | Yassin et al. | |
| 6,684,063 B2 | 1/2004 | Berger et al. | |
| 6,694,034 B2 | 2/2004 | Julstrom | |
| 6,694,143 B1 | 2/2004 | Beamish et al. | |
| 6,724,862 B1 * | 4/2004 | Shaffer et al. | ................. 379/52 |
| 6,747,561 B1 | 6/2004 | Reeves | |
| 6,816,083 B2 | 11/2004 | Brandt | |
| 6,879,695 B2 | 4/2005 | Maltan | |
| 6,925,179 B2 | 8/2005 | Waldron | |
| 7,042,986 B1 * | 5/2006 | Lashley et al. | ................. 379/52 |
| 7,108,177 B2 * | 9/2006 | Brookner | .................... 235/382 |
| 7,304,585 B2 * | 12/2007 | Suomela et al. | ........ 340/825.69 |
| 2003/0045283 A1 | 3/2003 | Hagedoorn | |
| 2006/0025172 A1 | 2/2006 | Hawker | |
| 2006/0109083 A1 * | 5/2006 | Rathus et al. | .............. 340/10.1 |
| 2006/0126873 A1 | 6/2006 | Lee | |
| 2006/0147069 A1 | 7/2006 | Svajda | |

OTHER PUBLICATIONS

Nokia Mobile RFID Kit. http://www.nokia.com/BaseProject/Sites/NOKIA_MAIN_18022/CDA/Categories/Business/DocumentCenter/_Content/_Static_Files/rfid_, As printed on Jan. 25, 2005.

* cited by examiner

*Primary Examiner*—Walter F Briney, III
(74) *Attorney, Agent, or Firm*—Parks IP Law LLC; Mickki D. Murray, Esq.

(57) ABSTRACT

An electronic device includes a receiver, a processor, and a presence activation sensor configured to receive a signal from a user. The user signal includes a user specific performance parameter, or the user specific performance parameter may be accessed from a memory by the processor in response to the user signal. In non-enhanced mode operation, the device receives standard signals and outputs them according to standard performance parameters. In enhanced mode operation the device receives standard signals, as well as a user signal which triggers the processor to manipulate the standard signals to output unique signals according to the user specific performance parameters.

31 Claims, 4 Drawing Sheets

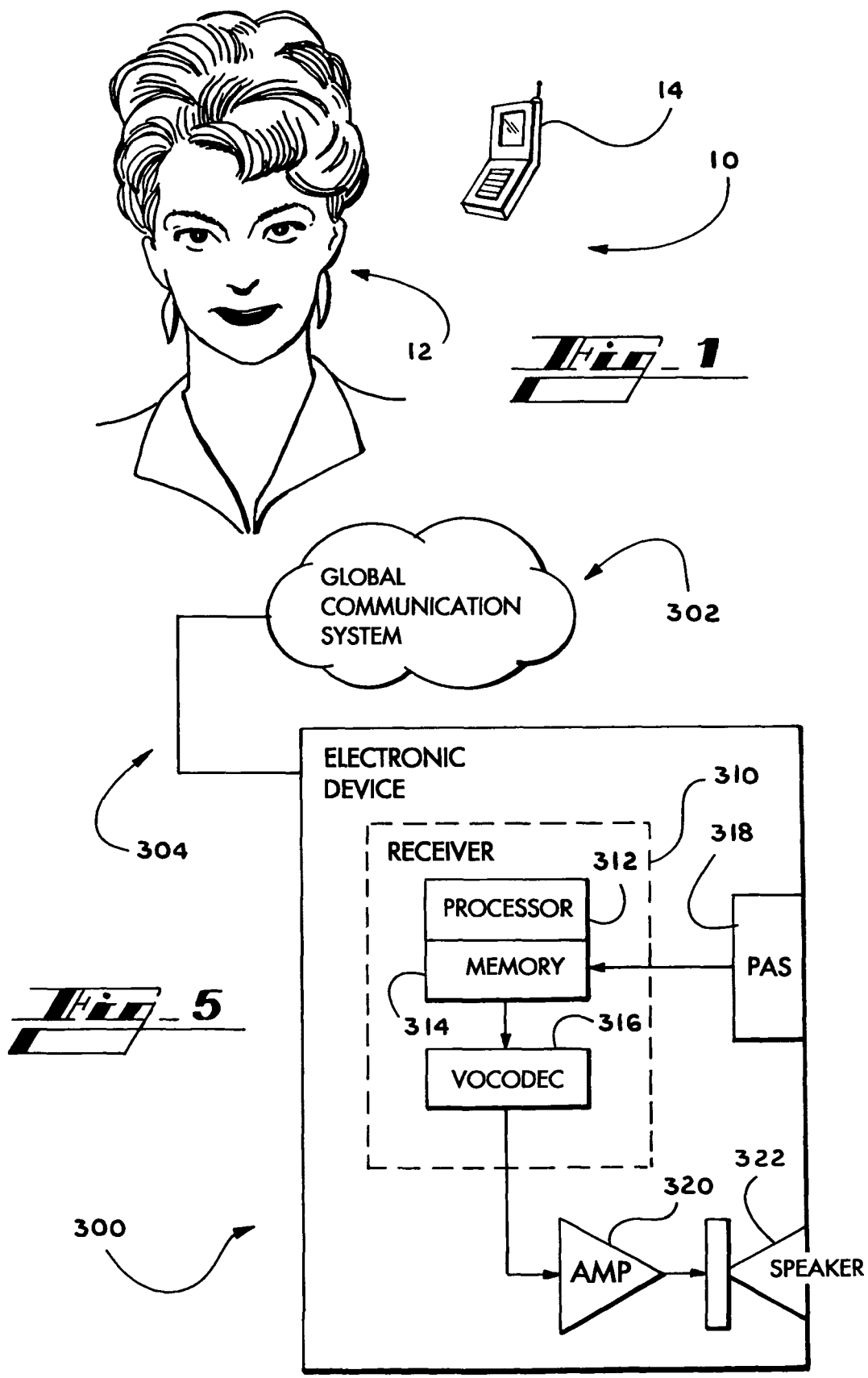

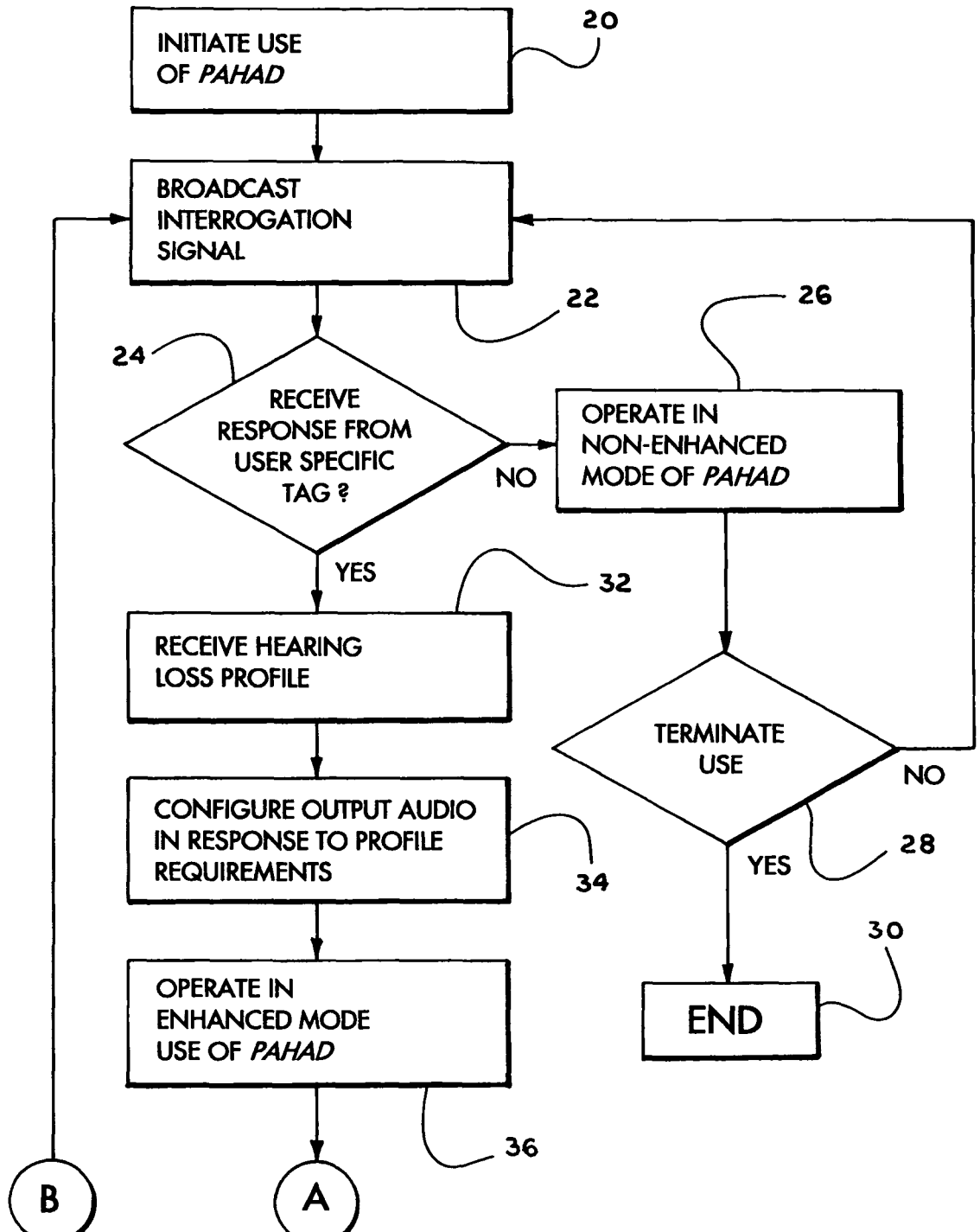
Fig_2A

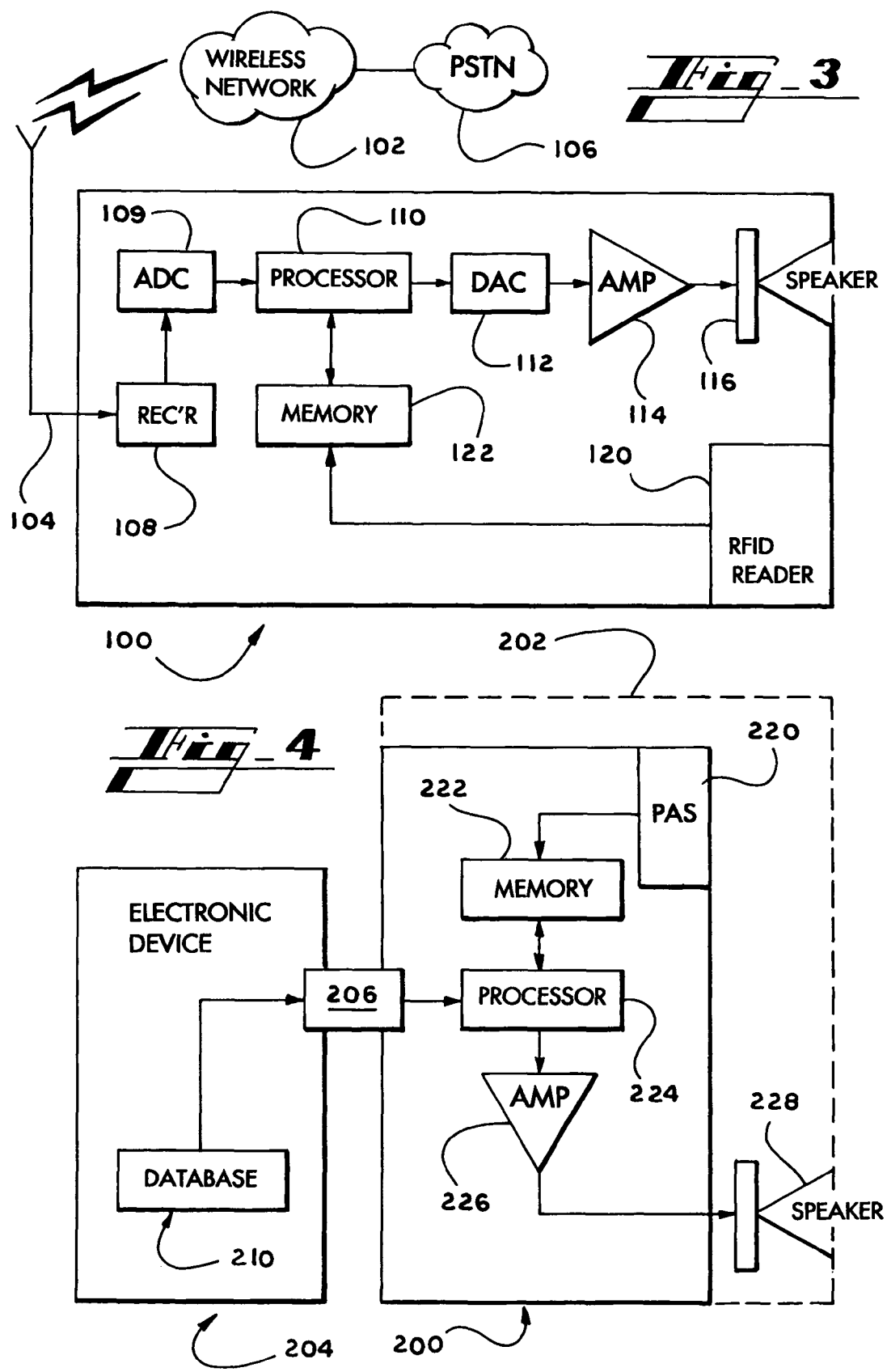

PRESENCE ACTIVATED HEARING ASSISTIVE SYSTEM

CROSS-REFERENCE TO RELATED APPLICATIONS

This application claims priority to U.S. Provisional Application No. 60/655,112, filed on Feb. 22, 2005, which is entirely incorporated herein by reference.

FIELD OF THE INVENTION

The present invention relates generally to systems and methods used for controlling the characteristics of an audio emitting device, such as an electronic file player, radio, or cellular telephone. More specifically, the present invention is directed to automatically configuring or controlling the audio signal transmitted by audio emitting devices based on the unique hearing needs of the listener.

BACKGROUND

People with hearing loss face two perennial problems. First, of course, is the obvious: a diminished capacity to hear that which those with normal hearing can easily decipher. Second and less obvious is that the more common hearing assistive devices, namely hearing aids, are typically not compatible with many devices that transmit or emit audio. For example, a person who wears a hearing aid throughout his or her waking hours may find the hearing aid is useless or even causes discomfort when he or she tries to operate, interface with, or otherwise use audio producing devices such as radios, telephones, electronic file players, ear phones, headsets, and the like. In such situations the hearing aid user's present choices are generally limited to using uniquely designed audio producing devices, using a standard audio producing device with a different hearing assistive device, or avoiding the standard audio producing device altogether.

Alternatives to hearing aids are known. For example, teletypewriters and closed-captioned systems have been developed, both of which permit the hearing impaired to read that which would otherwise be spoken. Another alternative to hearing aids are assistive listening devices (ALD). An ALD is an attempt to improve the individual listening experience, and these include FM systems, infrared systems, and induction loop systems.

Attempts to improve the listening experience of those with hearing loss are driven by market and social factors, including increased interaction with audio emitting devices, increased life-span coupled with naturally decreasing hearing abilities, and government mandates. With regard to the latter, the Americans with Disabilities Act (ADA) was signed into law in 1990. The ADA requires public services and buildings to make reasonable accommodations to allow access to persons with disabilities, including those with hearing loss. Many large corporations with numerous employees are sometimes known to voluntary integrate ADA requirements. Alternatively, such entities are sometimes considered to be providing a public service for purposes of the ADA, and are required to comply.

Because hearing aids are so popular there have been many attempts to make hearing aids compatible with other audio equipped communication devices. For example, some attempts provide mechanical solutions such as ear shrouds and ear cups around speakers that are held close to the user's ear. Other attempts include devices with adjustable gain, and devices that permit a standard earpiece speaker to be replaced by a unique earpiece speaker suitable for a particular user. Still further attempts include creating a shield around the audio transmitting device to reduce or eliminate radio frequency interference. All of these attempts appear to have narrow application or are directed to a device that is then usable only by a unique individual.

More recently, driven by the dramatic shift in telecommunications away from the hard-wired telephone to the wireless or cellular telephone, incompatibility with audio emitting devices in the form of cell phones is an issue that increasingly plagues hearing aid users. Interference by cell phones with hearing aids in the audio range can be caused by RF emissions, display backlighting, display strobing, and processor noise in any electronic device including a cell phone. In addition, acoustic feedback often results when any audio emitting device is brought close to a hearing aid.

Various parties including hearing aid designers and manufacturers, specialty audio equipment manufacturers, cellular telephone manufacturers, wireless telecommunication service provides, and even ALD designers are presently attempting solutions to the increased problem of hearing aid compatibility within the context of wireless telecommunications. Some attempts to solve the problem of hearing aid compatibility as it regards cell phones have been at the macro level, such as regulating power to the base station transmitter in an effort to avoid introducing harmonics in the audio frequencies. Other attempts have been at a micro-level, for instance, introducing an intermediate low frequency device between the cell phone and user that attempts to reduce interference in the hearing aid due to transmission of the wireless telephone. Still other attempts have been directed to the individual cell phone, for example, providing smart cards to configure the audio output of electronic devices, including cell phones.

A review of the known art confirms that a comprehensive solution to the problem of providing an improved listening experience to the hearing impaired remains elusive. A comprehensive solution would allow a hearing impaired user to successfully operate, interface with, or otherwise use an audio producing device. In addition, a comprehensive solution would provide entities who wish as well as those under government mandate with a way to economically accommodate those with hearing loss. Further, a comprehensive solution would provide audio producing systems that can be used seamlessly by people of all hearing abilities.

SUMMARY

The present invention provides the comprehensive solution that, until now, remained elusive. In its various embodiments the present invention allows a hearing impaired user to successfully operate, interface with, or otherwise use an audio producing device, provides entities who wish—as well as those under government mandate—with a way to economically accommodate those with hearing loss, and provides audio emitting or transmitting systems that can be used seamlessly by people of all hearing abilities.

In exemplary embodiments, the systems and methods described herein are directed to controlling—based on the unique needs of the listener—one or more performance characteristics of an electronic device that emits or transmits an audio signal. One embodiment of a system claimed herein includes a Presence Activated Hearing Assistive Device (PAHAD) and a User Specific Tag (UST).

As taught herein, a PAHAD is any electronic device capable of emitting or transmitting an audio signal in response to the pre-determined needs of the listener. By way of example and not limitation, PAHADs include radios, electronic file players, electronic signal transmitters of all kinds including those in communication with devices capable of broadcasting to multiple individuals, headsets, ear buds, telecommunication devices of all types, and the like. Further, a PAHAD is configured to interface with and operate in response to a UST, or in response to the absence thereof.

In one embodiment, a UST worn by or associated with a hearing impaired user is interrogated or read by the PAHAD to determine the specific hearing loss profile (HLP) for that user. Here the HLP is stored on an RFID tag or similar device, which itself may be, or may be integral to, the UST. In some embodiments a UST may be worn by the hearing impaired user as an accessory or jewelry item, affixed to the ear, head, or hand, or implanted under the skin of the user's head near each ear. In some embodiments, more than one UST may be worn; for example, when a user requires a different HLP for each ear. In other embodiments a UST is merely a trigger device, such as a magnet, that closes contacts positioned within the PAHAD which in turn directs the PAHAD to retrieve the user's stored HLP.

A HLP may include a user's specific hearing loss profile, an indicator that represents a typical hearing loss profile, or an ID to allow access to a user's profile stored at a central location. Central locations may include a single accessible computer, for example, located at a place of employment; a telecommunication provider's switch, such as a home location register (HLR); or a file repository located anywhere in the world, accessible via a private or public network including the Internet. HLPs may be created through hearing tests administered by an audiologist, or by automated testing methods including user selected menus of preset profiles available at kiosks and similar computer related devices. USTs for typical hearing loss profiles may be marketed in a variety of hearing loss profiles and be available for purchase from retailers.

Alternative exemplary embodiments of apparatus and systems that incorporate a PAHAD are taught herein. In one embodiment, the PAHAD is in the form of a wireless communication device (WCD) such as but not limited to a shortwave radio, walkie-talkie, or cellular telephone. There, the PAHAD comprises a presence activation sensor for interrogating, reading, or otherwise communicating with a separate UST, and further comprises a receiver, processor, amplifier, speaker, and memory in communication with the sensor and processor. Improved embodiments may further comprise an antenna, an audio to digital converter in communication between the receiver and processor, and a digital to audio converter in communication with the processor and amplifier. In operation, the WCD delivers an audible signal to a user according to the parameters defined by the UST.

Another exemplary embodiment is a PAHAD in the form of a presence activated module (PAM). There the PAHAD comprises a signal source in communication with a module, and a module comprising a presence activation sensor for interrogating, reading, or otherwise communicating with a UST, a processor, an amplifier, a speaker, and memory in communication with the sensor and processor. By way of example a signal source is any electronic device comprising a receiver, database, processor, or computer readable medium configured to transmit, emit, or otherwise process an audio signal. In operation, the PAM delivers an audible signal to a user according to the parameters defined by the UST.

Yet another exemplary embodiment is a PAHAD in the form of a global communication device (GCD). There the PAHAD comprises an electronic device in communication with a global communication system capable of interfacing with a network such as the Internet. One embodiment of a GCD comprises a presence activation sensor for interrogating, reading, or otherwise communicating with a UST, a receiver, processor, a voice or speech codec, an amplifier, a speaker, and memory in communication with the sensor and processor. In operation the GCD delivers an audible signal to a user according to the parameters defined by the UST.

In an exemplary method the PAHAD may work in a non-enhanced mode when it is not within the vicinity of a UST, thereby allowing a person with normal hearing to use the PAHAD device as if it were not a hearing assistive device. When the PAHAD comes within communication range of a UST, which could be restricted to a very short distance, the PAHAD would detect the presence of the UST and obtain the hearing assistive information from any of a variety of known methods, and in response, configure itself to modify its output audio profile to accommodate the needs of the user. If the user were to move the PAHAD from one ear to the other, the HLP associated with the second UST could be determined and in response the PAHAD could reconfigure itself to provide the correct profile for that ear. It may likewise reconfigure itself for the specific ear of any other hearing impaired users that was fitted with a compatible UST.

Alternative exemplary embodiments of methods that incorporate a PAHAD are taught herein. In one embodiment the UST is a presence activation device that includes a HLP. There, the PAHAD is activated in response to a communication from the UST, including the transfer of the HLP stored on the UST. In response to receiving the HLP, the PAHAD operates in an enhanced mode according to the HLP parameters.

Another exemplary embodiment of a method incorporates a PAHAD that can switch to a non-enhanced mode. There, the UST is a presence activation device that includes a HLP. The PAHAD is activated in response to a communication from the UST, including the transfer of the HLP stored on the UST. In response to receiving the HLP, the PAHAD operates in an enhanced mode according to the HLP parameters. During enhanced mode operation, the PAHAD may switch to a non-enhanced mode when the UST is beyond communication range, such as when a user wearing a UST walks away from a stationary PAHAD. Thus, a PAHAD may operate between enhanced and non-enhanced modes, depending on whether it is in communication with a UST.

An additional exemplary embodiment of a method incorporates a PAHAD that can switch between enhanced modes. There, the UST is a presence activation device that includes a HLP. The PAHAD is activated in response to a communication from the UST, including the transfer of a first HLP stored on a first UST. In response to receiving the first HLP, the PAHAD operates in a first enhanced mode according to the first HLP parameters. During that enhanced mode operation the PAHAD may switch to a second enhanced mode operation in response to a communication from a second UST, such as when a user wearing a first UST passes a PAHAD in the form of a headset to a second user associated with a second UST. Accordingly, a PAHAD may operate between as many different enhanced modes as it is in communication with different USTs.

In yet another embodiment of a method incorporating a PAHAD, the UST is a presence activation device that does not include a HLP. Rather, the PAHAD is activated in response to a trigger signal from a UST and in response to the trigger signal the PAHAD retrieves a locally stored HLP associated with the trigger signal. Thereafter, the PAHAD operates in an enhanced mode according to the retrieved HLP parameters. Similar to the embodiments taught herein, this embodiment includes the option of operating between enhanced and non-enhanced modes, as well as between enhanced modes.

In still another embodiment of a method incorporating a PAHAD, the UST is a presence activation device that does not include a HLP. Rather, the PAHAD is activated in response to a trigger signal from a UST and in response to the trigger signal the PAHAD retrieves a remotely stored HLP associated with the trigger signal. Thereafter the PAHAD operates in an enhanced mode according to the retrieved HLP parameters. Here the HLP is stored at a remote location, that is, not locally within the PAHAD. Similar to the embodiments taught herein, this embodiment includes the option of operating between enhanced and non-enhanced modes, as well as between enhanced modes.

BRIEF DESCRIPTION OF THE DRAWINGS

FIG. 1 illustrates an embodiment of a Presence Activated Hearing Assistive System in accordance with the present invention.

FIGS. 2A and 2B are a flowchart that illustrate the methods of some embodiments of the present invention.

FIG. 3 is a block diagram of an embodiment of a Presence Activated Hearing Assistive Device in accordance with the present invention.

FIG. 4 is a block diagram of an embodiment of a Presence Activated Module in accordance with the present invention.

FIG. 5 is a block diagram of another embodiment of a Presence Activated Hearing Assistive Device in accordance with the present invention.

DETAILED DESCRIPTION

Figure 2B:
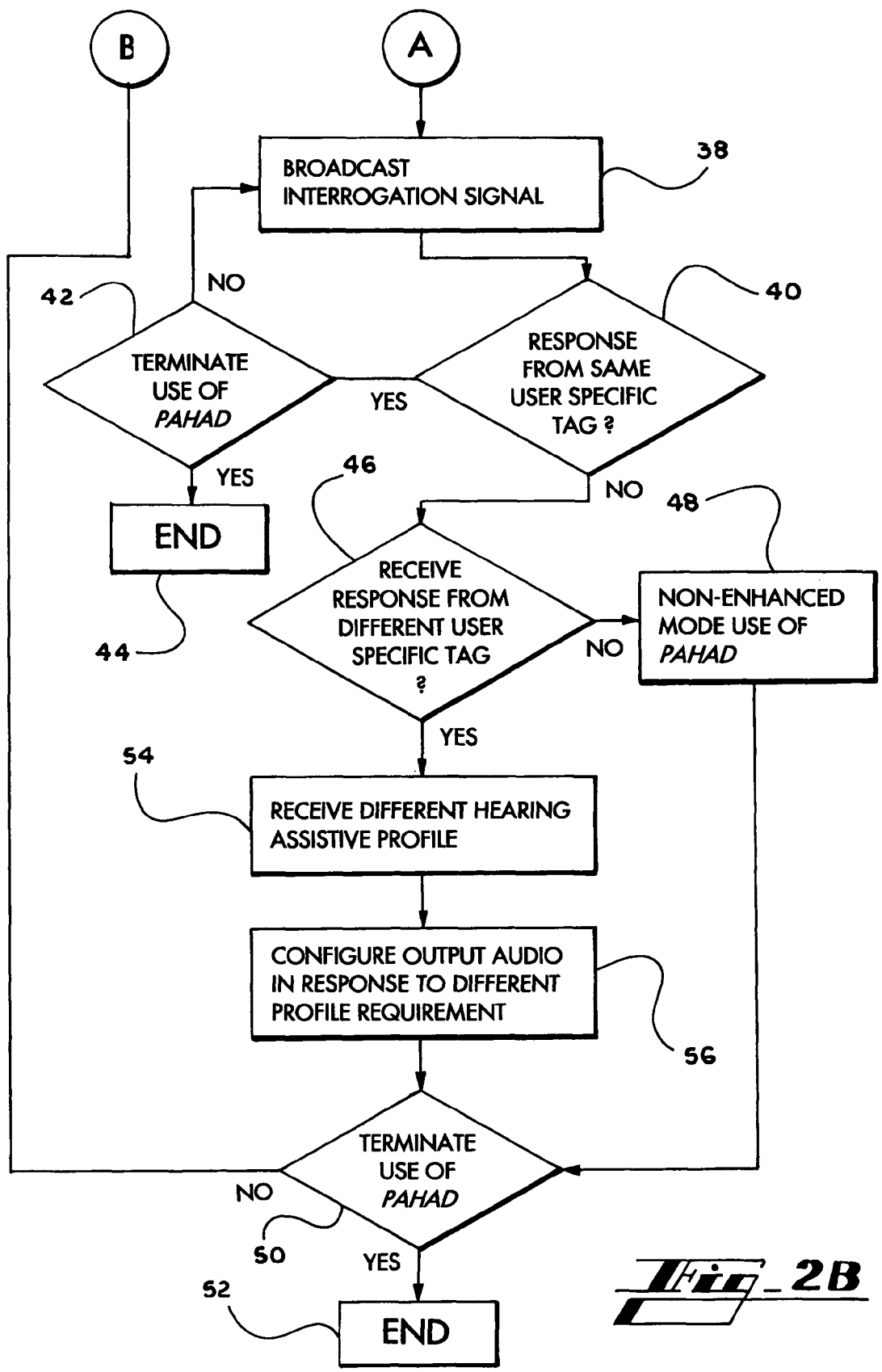

Generally speaking, the systems and methods described herein are directed to controlling—based on the unique needs of the listener—one or more performance characteristics of an audio equipped communications device. By applying what is taught herein to audio equipped communication devices generally, such a device can automatically configure its audio signal to accommodate or compensate for the unique hearing needs of the listener.

As required, embodiments of the present invention are disclosed herein. However, the disclosed embodiments are merely exemplary of the invention that may be embodied in many various and alternative forms. The figures are not to scale and some features may be exaggerated or minimized to show details of particular elements, while related elements may have been eliminated to prevent obscuring novel aspects. Therefore, specific structural and functional details disclosed herein are not to be interpreted as limiting, but merely as a basis for the claims and as a representative basis for teaching one skilled in the art to variously employ the present invention. For purposes of teaching and not limitation, the illustrated embodiments are directed to a communication device in the form of a cellular telephone.

Referring now to the drawings, wherein like numerals represent like elements throughout, FIG. 1 illustrates a hearing impaired user interacting with a Presence Activated Hearing Assistive System (PAHAS) 10. The illustrated PAHAS 10 comprises a User Specific Tag (UST) 12 and a Presence Activated Hearing Assistive Device (PAHAD) 14. As described in detail below, a UST 12 acts as trigger device that, when in proximity to a PAHAD 14, signals the PAHAD 14 to operate in one fashion or another.

A UST 12, as a trigger or a means for presence activation may take any of the many known forms, including: a magnet; a pre-determined light source such as but not limited to a laser, LED, ultra-violet, or infra-red light; a pre-determined sound signal or frequency; a radio-frequency identification (RFID) device; or any type of sensor including temperature and moisture. The illustrated UST 12 is in the form of an earring that includes a RFID tag. As understood by those skilled in the art, RFID tags are available in many variations and forms, including active, passive, semi-passive, and chipless. One purpose of an RFID is to store information, such as information related to the person wearing the RFID, which may be accessed or retrieved upon demand. One type of information related to the person that may be stored on a RFID for future access and use includes health related data such as past medical records, present medical needs, and future medical instructions.

A hearing impaired person is, generally speaking, considered to be someone with a diminished ability to hear without corrective means. In some cases the diminished ability is severe. A trained audiologist may evaluate the person's hearing loss and related disorders, and then manage a corrective regimen, including the dispensing of hearing aids and other corrective means. In the course of evaluating the patient's hearing loss, the audiologist typically prepares an audiogram or similar type of profile that describes the hearing loss. A person's Hearing Loss Profile (HLP) is one type of health related data that may be stored on a UST 12.

Here, the RFID tag imbedded in the illustrated UST 12 is a passive, read-only tag. Passive tags are not self-powered and are activated, typically, only upon interaction with an RFID reader. As understood by those skilled in the art, when radio waves from a reader reach a microchip antenna, the energy from those waves is converted by the antenna into electricity, which is used to power up the microchip in the tag. The tag is then able to send back information stored on the microchip. Here also, for the purposes of teaching and not limitation, the information stored on the microchip of the passive tag in the UST 12 is related to the hearing characteristics of the user, that is, the user's HLP.

Embodiments of the PAHAS 10 may include any variation of RFID tag embodied in a UST 12. Further, embodiments of the UST 12 may take any imaginable shape or form. For example, a UST 12 with an RFID tag may be worn on the person embedded in jewelry or similar wearable items including necklaces, earrings, piercings, watches or watch bands, bracelets, rings, cuff links, clothing, hats, scarves, neck ties, buttons, decorative pins, hair accessories including weaves and wigs, eyeglasses, and the like. Likewise, a very small UST 12 may be attached directly to a user's skin using adhesive or adhesive devices. Further, because implantable RFID's are extremely small, a UST 12 may be implanted in or under a user's skin. Alternatively, a UST 12 may take any form comprising any means for presence activation and simply be positioned proximate to the PAHAD 14.

Embodiments of the PAHAS 10 may include any variation of an audio equipped communication device. Here, the illustrated PAHAD 14 is a cell phone, but as understood by those skilled in the art, a PAHAD 14 comprises any audio device equipped to receive or transmit any distinguishable sound wave including speakers, radios, televisions, telephones, computers, personal digital assistants, cell phones, record or disc or tape or CD or DVD players of all types, audio file decoders such as but not limited to MP3 players, devices equipped with speech recognition software, headphones, headsets, or parts thereof, and the like.

It is taught herein that a PAHAS 10 may be operated by a user without hearing loss as well as by a user with hearing loss. A user without noticeable hearing loss would not likely be associated with a UST 12, while a user with a HLP would likely be associated with a UST 12. As described in greater detail herein, the PAHAD 14 may be equipped with apparatus that receives and processes the information stored in and transmitted by the UST 12. Thus, a user associated with a UST 12 can be identified by a PAHAD 14 when that user is sufficiently close to the PAHAD 14. Prior to discussing the apparatus regarding the PAHAD 14, the methods of operation directed to various embodiments of a PAHAS 10 will now be explained.

Turning to FIGS. 2A and 2B, there is shown a flowchart directed to various embodiments of the present invention. For the purpose of teaching and not as a limitation, embodiments of the PAHAS 10 will be explained in terms of variations of two modes: a non-enhanced mode and an enhanced mode.

Here, the non-enhanced mode does not include processing the sound waves to be transmitted in response to the unique needs of the user. In other words, although a UST 12 may activate a PAHAD 14, the PAHAD 14 operates in the non-enhanced mode by not processing the sound waves to be transmitted in response to user specific information, such as a user's HLP. Here, the enhanced mode includes processing the sound waves to be transmitted in response to the unique needs of the user. In other words, a UST 12 may activate a PAHAD 14, and in response the PAHAD 14 operates in the enhanced mode by processing the sound waves to be transmitted in response to user specific information, such as a user's HLP.

Operation of a PAHAS 10 begins with the step of initiating use 20 of the PAHAD 14. In the case of the illustrated cell phone, this step may be executed by simply pressing the ON or TALK button located on the typical cell phone. Alternatively, this step may be executed by positioning the UST 12 proximate to the cell phone as described herein.

With the PAHAD 14 activated it periodically broadcasts an interrogation signal 22, for example at intervals of seconds or milli-seconds, intended to be received by a RFID tag. Alternative embodiments may broadcast the interrogation signal 22 while in a sleep or resting condition. As understood by those skilled in the art, a means for presence activation such as an RFID tag imbedded in the UST 12 may be placed proximate to the PAHAD 14, that is, within the reader field, to receive the interrogation signal 22 via the RFID chip's antenna. That signal energy may be converted by the antenna into electricity that can power up the chip in the RFID tag. The RFID tag is then able to send back stored information, such as a user's HLP.

As shown in FIG. 2A, if there is no response signal 24 from the UST 12, the PAHAD 14 may operate in the non-enhanced mode 26 until the user decides to terminate use 28 and end activation 30. In the case of the illustrated cell phone, ending activation may include pressing the OFF or HANG UP button located on the typical cell phone. But while in the non-enhanced mode 26 and prior to ending 30, the PAHAD 14 may continue to periodically broadcast the interrogation signal 22 in search of a response from a UST 12 within the reader field. One reason for the periodic broadcast of an interrogation signal 22 is to provide, for example, the situation wherein a PAHAD 14 in non-enhanced mode operated by a user without hearing loss is passed to a user with hearing loss and associated with a UST 12 comprising a HLP. A similar situation arises when a user with unilateral hearing loss switches the PAHAD 14 from one ear associated with a UST 12 comprising a HLP to the other ear that may not be associated with a UST 12. In those situations, it may be preferred that the PAHAD 14 switch between the enhanced and non-enhanced modes.

Continuing with reference to FIG. 2A, if there is a response signal from a UST 12, before or during the operation of the non-enhanced mode, the PAHAD 14 receives that signal 24. In the illustrated embodiment, the step of receiving the signal 24 includes receiving a signal that comprises the HLP 32, in preparation of operating in the enhanced mode. As will be understood by those skilled in the art, the HLP does not have to be received from the UST 12 but may be stored in the PAHAD 14; in the case of a PAHAD 14 in communication with a remote database, the HLP 32 may be remotely stored and retrieved by the PAHAD 14.

Upon receiving, retrieving, uploading, or otherwise accessing the HLP 32, the PAHAD 14 processes the HLP information in order to configure or map the audio output best suited for the user's unique hearing loss. This processing, as described briefly herein and understood by those skilled in the art, includes manipulating characteristics of the digital or audio signals, such as but not limited to amplitude, velocity, wavelength, and frequency, which define the audio output.

For example, the HLP of a particular user may reveal he or she requires a deviation in pitch—deviation from the normal range found in the non-enhanced mode—in order to clearly hear the audio output without assistance from additional devices, such as hearing aids. Further, the HLP may reveal the user requires amplification of sounds within the range of 400 to 4,000 hertz. The step of configuring the digital or audio signal characteristics 34 in accordance with this specific HLP will provide an audible sound, adjusted for frequency and amplified, which can be clearly heard by this specific user without additional corrective aids.

Upon completing the step of configuring the output audio 34, the PAHAD 14 operates in the enhanced mode 36. Continuing with regard to FIG. 2B, while the PAHAD 14 operates in the enhanced mode it periodically broadcasts an interrogation signal 38 in a manner as explained above with regard to the step of broadcasting 22. If the enhanced mode interrogation signal 38 yields the same response signal 40 as the immediately previous enhanced mode interrogation signal 38, the PAHAD 14 may continue to operate in the enhanced mode 36 until the user decides to terminate use 42 and end activation 44. However, if the enhanced mode interrogation signal 38 does not yield the same response signal 40 as the immediately previous enhanced mode interrogation signal 38, but yields a different response 46, the PAHAD 14 may automatically switch to non-enhanced mode or to a different enhanced mode.

In the situation where the enhanced mode interrogation signal 38 yields no response, such as may happen after a user with a unilateral hearing loss moves the PAHAD 14 away from a UST 12 comprising a HLP (best shown in FIG. 1, thus removing the UST 12 from the reader field), to his or her other ear without a hearing loss or to a different user without a hearing loss, the PAHAD 14 may begin to operate in the non-enhanced mode 48. This switch from enhanced to non-enhanced mode may be accomplished by no longer configuring the audio or digital signals in response to a specific HLP. The PAHAD 14 may then operate in the non-enhanced mode 48 until the user decides to terminate use 50 and end activation 52 or until the interrogation signal 22 receives a response signal 24 and begins enhanced mode operation as described above.

In the situation where an enhanced mode interrogation signal 38 yields a response 46 different from the immediately previous enhanced mode interrogation signal 38, such as may happen after a user with a bilateral hearing loss moves the PAHAD 14 away from a first UST $12_1$, comprising a first HLP associated with one ear to his or her other ear associated with a second and different UST $12_2$ comprising a second HLP, or to a different user associated with a third and still different UST $12_n$ comprising a third HLP, the PAHAD 14 may operate in and between each of the different enhanced modes as prompted by the UST's $12_1, 12_2 \ldots 12_n$.

Upon receiving the signal designating a different HLP 54, the PAHAD 14 receives, retrieves, uploads, or otherwise accesses the different HLP information in order to configure or map the audio output best suited for the user with that unique hearing loss. As explained above with regard to Step 34, this processing includes manipulating characteristics of the digital or audio signals that produce the audio output. Upon completing the step of configuring the output audio in response to a different HLP requirement 56, the PAHAD 14 operates in that enhanced mode until it switches between enhanced and non-enhanced modes, or between enhanced modes, or until the user decides to terminate use 28, 42, 50 and end activation 30, 44, 52.

Apparatus of the present invention may be embodied in various and alternative configurations. For the purposes of teaching and not limitation, illustrated and taught herein are no less than three apparatus embodiments of a Presence Activated Hearing Assistive Device (PAHAD), first referenced with regard to FIG. 1.

Turning now to FIG. 4, there is shown a PAHAD in the form of a wireless communication device (WCD) 100. The WCD 100 is shown in the form of a cellular telephone in communication with a wireless network 102 through an antenna 104. Optionally, the wireless network may be in communication with a public switched telephone network PSTN 106, or other accessible networks. The WCD 100 is a means for wireless communication as are all audio-equipped devices configured to receive wireless signals and transmit distinguishable sound waves, including: speakers, radios, televisions, walkie-talkies, receivers, audio equipped computers, audio-equipped Blue-tooth devices, as well as satellite linked audio-equipped devices, and the like.

The illustrated WCD 100 includes a receiver 108, audio to digital converter 109, a micro-processor 110, a digital to audio converter 112, an amplifier 114, and a speaker 116, all connected by a power and signal bus. Elements not critical to the present teaching and well understood by those skilled in the art, such as the power supply, and not discussed. In operation, a wireless signal is received by the receiver 108 via the antenna 104. In the case of an audio signal, a first optional converter 109 converts the audio signal to a digital signal for processing by the micro-processor 110. After the signal is processed, herein in digital form and as explained below, a second optional converter 112 converts the digital signal to an audio signal. The audio signal is boosted by the amplifier 114 before being broadcast by the speaker 116.

The illustrated WCD 100 further includes a presence activated sensor 120 in communication with stored memory 122. Further, the memory 122 is in communication with the micro-processor 110. Here, the presence activated sensor 120 is a RFID reader that sends interrogation signals and receives replies from RFID tags, in a manner described herein and as understood by those skilled in the art.

A presence activated sensor 120, as a means for receiving a presence activation signal, is the element in communication with, or that is triggered by, a UST 12. Means for receiving a presence activation signal include those elements that register or become engaged when in communication with a means for presence activation, including: magnetic field; a pre-determined light source; a pre-determined sound or signal frequency; any RFID device; any type of sensor such as temperature or moisture, components thereof, and the like.

In embodiments wherein the means for receiving a presence activation signal does not receive or upload information, for example, a normally open switch that is closed by a magnetic field such as provided by a UST 12 that is a magnet, the closing of the switch may trigger the micro-processor 110 to access and retrieve a HLP stored in memory 122. As will be understood from the teaching directed to FIGS. 2A and 2B, each stored HLP may be uniquely identified with each UST 12. In other words, in certain embodiments, each UST 12 is associated with one HLP or a limited number of HLPs. In an embodiment wherein the means for receiving a presence activation signal does receive or upload stored information, for example, a RFID reader that receives a response signal containing a HLP from a RFID tag in a reader field, the HLP may be transferred directly to the processor.

Memory 122 may store the necessary programs to operate the means for receiving a presence activation signal, as well as related programs required for the operation of the WCD 100. Further, some embodiments of the WCD 100 may allow for the retrieval of a remotely stored HLP, such as a HLP stored on a database accessible through the wireless network 102. In those embodiments, the memory may include the location of that HLP and the retrieval program. Memory 122 may be read only (ROM) or random access (RAM), as the design needs require.

With the HLP loaded onto or otherwise accessible to the micro-processor 110, the illustrated WCD 100 is enabled to receive signals and manipulate them according to the unique needs of the hearing impaired listener. That is, the WCD 100 is configured to operate in the enhanced mode. By way of example and not limitation, a telephone call initiated on the PSTN 106 may be transmitted through the wireless network 103 and received by the receiver 108 via the antenna 104. The signals that comprise the telephone call may be output to a first converter 109 to be converted from audio to digital form before being output to the micro-processor 110. The micro-processor, having accessed or received the HLP, manipulates the characteristics of the digital signal in preparation of the WCD 100 producing an audio signal that can be understood by the hearing impaired user without additional assistive devices. Embodiments of the micro-processor 110 may comprise a graphic equalizer or similarly functional structure.

Upon completing the manipulation of the digital signal, the processor 110 outputs the signal to the optional converter 112, which returns the signal to audio form before outputting to the amplifier 114. Turning momentarily to include the HLP example referenced with regard to Step 34 shown in FIG. 2A, the signal received by the receiver 108 has now been adjusted in pitch and amplification within the range of 400 to 4000 hertz. Accordingly, upon outputting the signal from the amplifier 114 to the speaker 116 for broadcasting, the hearing impaired user associated with the HLP example will clearly hear the call initiated on the PSTN 106, without additional corrective devices.

Turning now to FIG. 5, there is shown a Presence Activated Hearing Assistive Device in the form of a presence activated module (PAM) 200. This PAM 200 is shown in the form of an electronic device that may be attached to or made integral with a wearable audio-output device (WAD) 202 such as but not limited to ear buds, headphones, headsets, and the like, in communication with an electronic transmission device (ETD) 204 through a wired or wireless interface 206. The electronic transmission device 204 is a means for audio communication as are all devices configured to receive and/or store and/or transmit signals to be broadcast as sound, including: radios, televisions, walkie-talkies, telephones, receivers, computers, Blue-tooth devices, audio-file storage devices, audio-file player devices, electronic medium players, tape players, compact disc players, components thereof, and the like.

The illustrated ETD 204 includes a signal source such as a receiver or a database. For purposes of teaching and not limitation, this embodiment of an ETD 204 is shown with a database 210. The illustrated PAM 200 includes a presence activated sensor 220, a stored memory 222, a micro-processor 224, an amplifier 226, and a speaker 228 all connected by a power and signal bus (not shown). Elements not critical to the present teaching and well understood by those skilled in the art, such as the power supply, and not discussed.

A presence activated sensor 220, as a means for receiving a presence activation signal, is the element in communication with, or that is triggered by, a UST 12. Means for receiving a presence activation signal include those elements that register or become engaged when in communication with a means for presence activation, including: magnetic fields; a pre-determined light source; a pre-determined sound or signal frequency; any RFID device; any type of sensor such as temperature or moisture, components thereof, and the like. Here, the presence activated sensor 220 is a RFID reader that sends interrogation signals and receives replies from RFID tags, in a manner described herein and as understood by those skilled in the art. Here also, the speaker 228 may be integral to the PAM 200 or integral to the WAD 202 and in communication with the PAM 200. The speaker location and form of communication, with regard to the PAM 200, is merely a design choice.

In operation, an audio signal or audio file is retrieved, accessed, transmitted, or otherwise output from the signal source 210 via the interface 206 to the micro-processor 224 for processing. After the signal is processed and output, as explained herein, the audio signal is boosted by the amplifier 226 before being broadcast by the speaker 228.

In embodiments wherein the means for receiving a presence activation signal does not receive or upload information, for example, a normally open switch that is closed by a magnetic field such as provided by a UST 12 that is a magnet, the closing of the switch may trigger the micro-processor 224 to access and retrieve a HLP stored in memory 222. As will be understood from the teaching directed to FIGS. 2A and 2B, each stored HLP may be uniquely identified with each UST 12. In other words, in certain embodiments each UST 12 is associated with one HLP or a limited number of HLPs. In an embodiment wherein the means for receiving a presence activation signal does receive or upload stored information, for example, a RFID reader that receives a response signal containing a HLP from a RFID tag in a reader field, the HLP may be transferred directly to the processor.

Memory 222 may store the necessary programs to operate the means for receiving a presence activation signal, as well as related programs required for the operation of the PAM 200 and/or the WAD 202 and/or the ETD 204. Further, some embodiments of the PAM 200 may allow for the retrieval of a stored HLP, such as a HLP stored on the database 210. In those embodiments the memory may include the location of that HLP and the retrieval program. Memory 222 may be read only (ROM) or random access (RAM), as the design needs require.

With the HLP loaded onto or otherwise accessible to the micro-processor 224, the illustrated PAM 200 is enabled to receive signals and manipulate them according to the unique needs of the hearing impaired listener. That is, the PAM 200 is configured to operate in the enhanced mode. By way of example and not limitation, a music file of Bruce Springsteen's Thunder Road stored on a signal source 204 such as an ipod® brand MP3 player may be retrieved via an integral menu. The signals that comprise Thunder Road are retrieved from the database and output to the processor 224 via the interface 206, which includes the signal and power bus. The micro-processor 224, having accessed or received the HLP, manipulates the characteristics of the signals in preparation of the PAM 200 producing an audio signal that can be understood by the hearing impaired user without additional assistive devices. Embodiments of the micro-processor 224 may comprise a graphic equalizer or similarly functional structure.

Upon completing the manipulation of the signals that comprise the music file, the processor 224 outputs the signal to the amplifier 226. Turning momentarily to include the HLP example referenced with regard to Step 34 shown in FIG. 2A, the signals retrieved from the signal source 210 have now been adjusted in pitch and amplification within the range of 400 to 4000 hertz. Accordingly, upon outputting the signal from the amplifier 226 to the speaker 228 for broadcasting, the hearing impaired user associated with the HLP example will clearly hear the song Thunder Road through a WAD 202, such as ear buds, without additional corrective devices.

Turning now to FIG. 6, there is shown a Presence Activated Hearing Assistive Device in the form of a global communication device (GCD) 300. The GCD 300 is shown in the form of an audio/video player in communication with a global communication system (GCS) 302, such as the Internet or similarly accessible network, through a wired or wireless communication link 304. The GCD 300 is a means for global communication as are all audio-equipped devices configured to receive signals and transmit distinguishable sound waves, including: speakers, audio equipped computers, audio-equipped PDAs, audio-equipped Bluetooth® enabled devices, televisions, walkie-talkies, telephones including cellular phones, receivers, audio/video-file storage devices, audio/video-file player devices, electronic medium players of all kinds, components thereof, and the like.

The illustrated GCD 300 comprises a receiver 310 that further includes a micro-processor 312, memory 314, a voice or speech codec 316, a presence activated sensor 318 in communication with the memory 314, an amplifier 320, and a speaker 322 all connected by a power and signal bus. Elements not critical to the present teaching and well understood by those skilled in the art, such as the power supply, and not discussed.

A presence activated sensor 318, as a means for receiving a presence activation signal, is the element in communication with, or that is triggered by, a UST 12. Means for receiving a presence activation signal include those elements that register or become engaged when in communication with a means for presence activation, including: magnetic fields; a pre-determined light source; a predetermined sound or signal frequency; any RFID device; any type of sensor such as temperature or moisture, components thereof, and the like. Here, the presence activated sensor 318 is a RFID reader that sends interrogation signals and receives replies from RFID tags, in a manner described herein and as understood by those skilled in the art.

In operation, an electronic file is retrieved, accessed, transmitted, or otherwise output from the GCS 302 and received by the receiver 310 via the communication link 304. By way of example and not limitation, such electronic files comprise all videos, including: music, movies, shows, and sporting events; audio books; streamed audio; audio broadcasts; electronic games; and any other type of electronic file that when read or played on an electronic device outputs a video or audio portion. With regard to the audio portion, after the signal is processed by the processor 312 as explained herein, the codec 316 converts digital code to audible sound, such as spoken words and sound effects. The audible sound is then boosted by the amplifier 320 before being broadcast by the speaker 322.

In embodiments wherein the means for receiving a presence activation signal does not receive or upload information, for example, a normally open switch that is closed by a magnetic field such as provided by a UST 12 that is a magnet, the closing of the switch may trigger the micro-processor 312 to access and retrieve a HLP stored in memory 314 or stored elsewhere within the GCS 302. As will be understood from the teaching directed to FIGS. 2A and 2B, each stored HLP may be uniquely identified with each UST 12. In other words, in certain embodiments each UST 12 is associated with one HLP or a limited number of HLPs. In an embodiment wherein the means for receiving a presence activation signal does receive or upload stored information, for example, a RFID reader that receives a response signal containing a HLP from a RFID tag in a reader field, the HLP may be transferred directly to the processor.

Memory 314 may store the necessary programs to operate the means for receiving a presence activation signal, as well as related programs required for the operation of the GCD 300. Further, some embodiments of the GCD 300 may allow for the retrieval of a remotely stored HLP, such as a HLP stored at a remote location accessible through the GCS 302. In those embodiments the memory may include the location of that HLP and the retrieval program. Memory 314 may be read only (ROM) or random access (RAM), as the design needs require.

With the HLP loaded onto or otherwise accessible to the micro-processor 312, the illustrated GCD 300 is enabled to receive an electronic file and manipulate the audio portion according to the unique needs of the hearing impaired listener. That is, the GCD 300 is configured to operate in the enhanced mode. By way of example and not limitation, a multi-media file such as Grand Theft Auto III® intended for interactive use on a PlayStation® brand audio/digital player may be purchased and downloaded from a Sony® approved retailer accessible through the GCS 302 and received by the receiver 310. The micro-processor 312, having accessed or received the HLP, manipulates the characteristics of the audio portion in preparation of the GCD 300 producing an audio signal that can be understood by the hearing impaired user without additional assistive devices. Embodiments of the micro-processor 312 may comprise a graphic equalizer or similarly functional structure.

Upon completing the manipulation of the audio portion, the processor 312 outputs those digital signals to the codec 316, which converts the digital signal to audio form before outputting to the amplifier 320. Turning momentarily to include the HLP example referenced with regard to Step 34 shown in FIG. 2A, the audio portion of the file received by the receiver 310 has now been adjusted in pitch and amplification within the range of 400 to 4000 hertz. Accordingly, upon outputting the signal from the amplifier 320 to the speaker 322 for broadcasting, the hearing impaired user associated with the HLP example will clearly hear the audio portion of Grand Theft Auto III® through his or her PlayStation® without additional corrective devices.

Again, the above-described and illustrated embodiments of the present invention are merely exemplary examples of implementations set forth for a clear understanding of the principles of the invention. Variations and modification may be made to the above-described embodiments, and the embodiments may be combined, without departing from the scope of the following claims.

We claim:

1. A presence activated hearing assistive apparatus comprising:
    a receiver configured to:
        receive an audio signal; and
        output the audio signal to a processor;
    a presence activation sensor configured to:
        determine that the hearing assistive apparatus is proximate an ear of a user by recognizing received data as a user signal received from a user-specific transmitter tag associated with the ear of the user, wherein the user signal comprises a hearing loss parameter associated with the ear of the user; and
        output the user signal to the processor;
    the processor being configured to:
        receive the audio signal from the receiver and the user signal from the presence activation sensor;
        switch the hearing assistive apparatus to an enhanced mode in response to the presence activation sensor determining that the hearing assistive apparatus is proximate the ear of the user; and
        manipulate the audio signal in accordance with the hearing loss parameter of the user signal only if the hearing assistive apparatus is in the enhanced mode, proximate the ear of the user;
    an amplifier configured to receive and amplify the manipulated audio signal; and
    a speaker configured to receive and output the manipulated and amplified audio signal;
    wherein the processor is further configured to switch the hearing assistive apparatus away from the enhanced mode in response to the presence activation sensor determining that the hearing assistive apparatus is not proximate the ear of the user.

2. The apparatus of claim 1, further comprising an analog-to digital converter in communication with the receiver, configured to receive and convert the audio signal being an analog signal to a digital signal, and output the digital signal to the processor to be manipulated.

3. The apparatus of claim 2, further comprising a digital-to-analog converter converter configured to receive and convert the manipulated digital signal to a manipulated analog signal, and output the manipulated analog signal to the amplifier.

4. The apparatus of claim 1, further comprising a memory in communication with the processor, wherein the memory is configured to store the hearing loss parameter and provide the user signal having the parameter to the presence activation sensor.

5. The system of claim 1, wherein the user-specific transmitter tag comprises a presence activation signal emitter.

6. The system of claim 5, wherein the presence activation sensor comprises a presence activation signal receiver.

7. The system of claim 6, wherein the presence activation signal emitter comprises a radio frequency identification (RFID) device.

8. The system of claim 7, wherein the activation signal receiver comprises an radio frequency identification (RFID) reader.

9. The apparatus of claim 1, further including the user-specific tag, the tag being configured to attach to the user by one of:
    being affixed to the ear of the user;
    being affixed to a portion of skin of the user near the ear by adhesive; and
    being implanted under a portion of skin of the user near the ear.

10. The apparatus of claim 1, wherein the ear of the user is a first ear of the user, and the processor, in being configured to switch the hearing assistive apparatus away from being in the enhanced mode in response to the presence activation sensor determining that the hearing assistive apparatus is not proximate the ear of the use, is configured to switch the hearing assistive apparatus to a non-enhanced mode if the hearing assistive apparatus is proximate a second ear of the user.

11. The apparatus of claim 1, wherein:
the user-specific transmitter tag associated with the ear of the user is a first user-specific transmitter tag associated with the ear, being a first ear of the user;
the presence activation sensor is further configured to:
  determine that the hearing assistive apparatus is proximate a second ear of a user, by determining that the hearing assistive apparatus is proximate a second user-specific transmitter tag associated with the second ear of the user by recognizing received data as a second user signal received from the second user-specific transmitter tag, wherein the second user signal comprises a hearing loss parameter associated with the second ear of the user being different than the hearing loss parameter associated with the first ear of the user; and
  output the second user signal to the processor; and
the processor is further configured to:
  receive the second user signal;
  switch the hearing assistive apparatus to a second enhanced mode, being different than the first enhanced mode, in response to the presence activation sensor determining that the hearing assistive apparatus is proximate the second ear of the user; and
  manipulate the audio signal in accordance with the second user signal if the hearing assistive apparatus is in the second enhanced mode, proximate the second ear of the user.

12. The apparatus of claim 11, further comprising the first user-specific tag and the second user-specific tag, wherein the first user-specific tag and the second user-specific tag are configured to attach to the user by one of:
being affixed to the first ear of the user and the second ear of the user, respectively;
being affixed to a portion of skin of the user by adhesive near the first ear and near the second ear, respectively; and
being implanted under a portion of skin of the user near the first ear and near the second ear, respectively.

13. A method for assisting hearing of a user utilizing a presence activated hearing assistive device, the method comprising:
determining, at a presence activation sensor of the presence activated hearing device, that the hearing assistive device is proximate an ear of the user by recognizing received data as a user signal received from a user-specific transmitter tag associated with the ear of the user, wherein the user signal comprises a hearing loss parameter associated with the ear of the user;
receiving, at a receiver of the hearing assistive device, a user signal transmitted by the user-specific transmitter tag, the user signal comprising a hearing loss parameter;
a processor of the hearing assistive device switching the hearing assistive device to an enhanced mode in response to the presence activation sensor determining that the hearing assistive device is proximate the ear of the user;
only if the hearing assistive device is in the enhanced mode, proximate the ear of the user, manipulating, at the processor of the hearing assistive device, audio signals in accordance with the hearing loss parameter of the user signal;
outputting, at a speaker associated with the hearing assistive device, the manipulated audio signal; and
the processor switching the hearing assistive device away from the enhanced mode in response to the presence activation sensor determining that the hearing assistive device is no longer proximate the ear of the user.

14. The method of claim 13, further comprising amplifying the manipulated audio signal.

15. The method of claim 14, further comprising broadcasting the manipulated audio signal from the speaker.

16. The method of claim 13, further comprising removing the device from proximity of the ear of the user.

17. The method of claim 16, further comprising switching, in response to the removing, from the enhanced mode to the non-enhanced mode.

18. The method of claim 13, wherein:
the user-specific transmitter tag associated with the ear of the user is a first user-specific transmitter tag;
the user signal is a first user signal comprising a second hearing loss parameter different from the first hearing loss parameter; and
the method further comprises substituting the first user-specific transmitter tag with a second user-specific transmitter tag configured to communicate a second user signal comprising the second hearing loss parameter.

19. The method of claim 18, further comprising manipulating the audio signal in accordance with the second hearing loss parameter of the second user signal.

20. The method of claim 19, further comprising amplifying the audio signal manipulated in accordance with the second hearing loss parameter of the second user signal.

21. The method of claim 20, further comprising broadcasting, from the speaker, the audio signal manipulated in accordance with the second hearing loss parameter of the second user signal.

22. The method of claim 13, further comprising attaching the user-specific tag to the user by one of:
affixing the user-specific tag to the ear of the user;
affixing the user-specific tag to a portion of skin of the user near the ear by adhesive; and
implanting the user-specific tag implanted under a portion of skin of the user near the ear.

23. The method of claim 13, wherein the ear of the user is a first ear of the user and the processor switching the hearing assistive device away from the enhanced mode in response to the presence activation sensor determining that the hearing assistive device is no longer proximate the ear of the user includes the processor switching the hearing assistive device to a non-enhanced mode if the hearing assistive device is proximate a second ear of the user.

24. The method of claim 13, wherein:
the user-specific transmitter tag associated with the ear of the user is a first user-specific transmitter tag associated with the ear of the user, being a first ear of the user; and
the method further comprises the processor of the presence activation sensor:
  determining that the hearing assistive device is proximate a second ear of a user, by determining that the hearing assistive device is proximate a second user-specific transmitter tag associated with the second ear of the user, by recognizing received data as a second user signal from the second user-specific transmitter tag, wherein the second user signal comprises a hearing loss parameter associated with the second ear of the user being different than the hearing loss parameter associated with the first ear of the user; and switching the hearing assistive device to a second enhanced mode in response to the processor determining that the hearing assistive device is proximate the second ear of the user; and manipulating the audio signal in accordance with the second user signal if the hearing assistive device is in the second enhanced mode, proximate the second ear of the user.

25. The method of claim 24, further comprising attaching the user-specific tag, including one of:

affixing to the first ear of the user and the second ear of the user, respectively;

affixing to a portion of skin of the user by adhesive near the first ear and near the second ear, respectively; and implanting under a portion of skin of the user near the first ear and near the second ear, respectively.

26. A wireless communication device, comprising:

a processor;

a receiver configured to receive an audio signal and output the signal to the processor;

a radio frequency identification (RFID) reader configured to:

receive a user signal from a user-specific transmitter tag; and output the user signal to the processor wherein the processor is configured to:

determine that the wireless communication device is proximate the ear of a user by recognizing received data as a user signal received from a user-specific transmitter tag associated with the ear of the user, wherein the user signal comprises a hearing loss parameter associated with the ear of the user;

receive the audio signal from the receiver and the user signal from the RFID reader;

manipulate the audio signal in accordance with the user signal if it is determined that the wireless communication device is proximate the ear of the user; and switch the wireless communication device away from the enhanced mode in response to the presence activation sensor determining that the wireless communication device is no longer proximate the ear of the user.

27. The device of claim 26, further comprising a memory in communication with the processor, wherein the memory is configured to store the hearing loss parameter and provide the user signal having the parameter to the presence activation sensor.

28. The wireless communication device of claim 26, wherein the processor, in being configured to determine that the wireless communication device is proximate the ear of the user by recognizing received data as the user signal received from the user-specific transmitter tag associated with the ear of the user, is configured to determine that the wireless communication device is proximate the ear of the user by recognizing received data as the user signal received from the user-specific transmitter tag being attached to the user by one of:

being affixed to the ear of the user;

being affixed to a portion of skin of the user near the ear by adhesive; and being implanted under a portion of skin of the user near the ear.

29. The wireless communication device of claim 26, wherein the ear of the user is a first ear of the user, and the processor, in being configured to switch the wireless communication device away from the enhanced mode in response to the presence activation sensor determining that the wireless communication device is no longer proximate the ear of the user, is further configured to switch the wireless communication device to a non-enhanced mode if the wireless communication device is proximate a second ear of the user.

30. The wireless communication device of claim 26, wherein:

the user-specific transmitter tag associated with the ear of the user is a first user-specific transmitter tag associated with the ear, being a first ear of the user;

the presence activation sensor is further configured to:

determine that the wireless communication device is proximate a second ear of a user, by recognizing received data as a second user signal received from the second user-specific transmitter tag, wherein the second user signal comprises a hearing loss parameter associated with the second ear of the user being different than the hearing loss parameter associated with the first ear of the user; and output, to the processor, the second user signal; and the processor is further configured to:

receive the second user signal; and manipulate the audio signal in accordance with the second user signal if the presence activation sensor determines that the wireless communication device is proximate the second ear of the user.

31. The wireless communication device of claim 30, wherein the processor, in being configured to determine that the wireless communication device is proximate the first ear of the user and to determine that the wireless communication device is proximate the second ear of the user by recognizing received data as the user signal received from the user-specific transmitter tag associated with the ear of the user, is configured to determine that the wireless communication device is proximate the first ear of the user and that the wireless communication device is proximate the second ear of the user by recognizing received data as the user signal received from the first user-specific transmitter tag and the second user-specific transmitter tag with the first user-specific transmitter tag and the second user-specific transmitter tag are attached to the user by one of:

being affixed to the first ear of the user and the second ear of the user, respectively;

being affixed to a portion of skin of the user by adhesive near the first ear of the user and near the second ear of the user, respectively; and being implanted under a portion of skin of the user near the first ear and near the second ear, respectively.

* * * * *